(12) United States Patent
Tachibana

(10) Patent No.: US 11,994,222 B2
(45) Date of Patent: May 28, 2024

(54) VALVE DEVICE AND ELECTROLYZED WATER GENERATION DEVICE

(71) Applicant: NIHON TRIM CO., LTD., Osaka (JP)

(72) Inventor: Takahito Tachibana, Nankoku (JP)

(73) Assignee: NIHON TRIM CO., LTD., Osaka (JP)

( * ) Notice: Subject to any disclaimer, the term of this patent is extended or adjusted under 35 U.S.C. 154(b) by 382 days.

(21) Appl. No.: 17/624,400

(22) PCT Filed: May 26, 2020

(86) PCT No.: PCT/JP2020/020681
§ 371 (c)(1),
(2) Date: Jan. 3, 2022

(87) PCT Pub. No.: WO2021/010025
PCT Pub. Date: Jan. 21, 2021

(65) Prior Publication Data
US 2022/0356956 A1 Nov. 10, 2022

(30) Foreign Application Priority Data
Jul. 18, 2019 (JP) ................................. 2019-132957

(51) Int. Cl.
*F16K 11/085* (2006.01)
*C02F 1/461* (2023.01)
*F16K 27/06* (2006.01)

(52) U.S. Cl.
CPC ........ *F16K 11/0856* (2013.01); *C02F 1/4618* (2013.01); *F16K 27/065* (2013.01); *C02F 2001/4619* (2013.01); *C02F 2201/005* (2013.01); *C02F 2201/46115* (2013.01); *C02F 2201/4613* (2013.01)

(58) Field of Classification Search
None
See application file for complete search history.

(56) References Cited

FOREIGN PATENT DOCUMENTS

JP  2003-236549 A  8/2003
JP  2015-029929 A  2/2015

*Primary Examiner* — Brian W Cohen
(74) *Attorney, Agent, or Firm* — Muncy, Geissler, Olds & Lowe, P.C.

(57) ABSTRACT

A valve device 3 includes a housing 2 and a valve body 4. The valve body 4 has a first switching position where a first supply port 31 and a first discharge port 33 communicate via an inner flow path 44 and a second supply port 32 and a second discharge port 34 communicate via an outer flow path 45, a second switching position where the first supply port 31 and the second discharge port 34 communicate via the outer flow path 45 and the second supply port 32 and the first discharge port 33 communicate via the inner flow path 44, a third switching position where the first supply port 31 and the first discharge port 33 communicate via the outer flow path 45 and the second supply port 32 and the second discharge port 34 communicate via the inner flow path 44, and a fourth switching position where the first supply port 31 and the second discharge port 34 communicate via the inner flow path 44 and the second supply port 32 and the first discharge port 33 communicate via the outer flow path 45.

11 Claims, 14 Drawing Sheets

VALVE DEVICE AND ELECTROLYZED WATER GENERATION DEVICE

FIELD OF THE INVENTION

The present invention relates to a valve device and an electrolyzed water generation device using the same.

BACKGROUND OF THE INVENTION

Conventionally, an electrolyzed water generation device has been known in which electrolyzed water produced on a cathode side and electrolyzed water produced on an anode side are mixed to produce mixed electrolyzed water. For example, disclosed in Patent Literature 1 is a valve device for producing the above-described mixed electrolyzed water.

PRIOR ART DOCUMENT

Patent Literature

Patent Literature 1: Japanese Unexamined Patent Application Publication No. 2015-29929

SUMMARY OF THE INVENTION

Problems to be Solved by the Invention

Disclosed in the above-described Patent Literature 1 is the valve device provided with an inner flow path extending as penetrating through the inside of an internal cylinder body and an outer flow path formed between an outer peripheral surface of the internal cylinder body and an external cylinder body.

On the other hand, in the electrolyzed water generation device of Patent Literature 1, in addition to mixed electrolyzed water, electrolyzed water produced on the cathode side and electrolyzed water produced on the anode side can also be individually taken out without being mixed (refer to paragraph [0036]). Also, in the electrolyzed water generation device of PTL 1, a technique is adopted in which the polarities of the electrodes in the anode chamber and the cathode chamber are reversed after a lapse of a predetermined period of time in order to clean off scale attached to the electrodes (refer to paragraphs [0002] and [0138] of the literature). Upon reversing the polarities, as depicted in FIGS. 3 and 4, the rotational angle position of the internal cylinder body with respect to the external cylinder body is changed, and thereby electrolyzed water (electrolytic hydrogen water or electrolytic acidic water) selected by a user is taken out via an electrolyzed water drain outlet on one side.

Electrolytic hydrogen water produced on the cathode side attracts attention because it is effective for alleviating gastrointestinal symptoms. Therefore, in most cases, users prefer and select electrolytic hydrogen water.

However, in the valve device disclosed in Patent Literature 1 described above, the first electrolyzed water drain outlet 10*a* on one side always communicates with the outer flow path. Thus, when a user continuously selects electrolytic hydrogen water, electrolyzed water produced on the cathode side continuously flows into the outer flow path regardless of polarity switching, thereby causing scale to be precipitated and deposited in the outer flow path.

The present invention was made in view of the above, and a primary object thereof is to provide a valve device and so forth capable of reducing deposition of scale in the flow path.

Means for Solving the Problem

The first aspect of the present invention is a valve device including a cylindrical housing defining a space therein, and a valve body disposed in the space of the housing so as to be rotatable around an axial direction of the housing, wherein the housing is provided with a first supply port, a second supply port, a first discharge port, and a second discharge port each communicating with the space, the valve body is provided with an inner flow path extending so as to penetrate through inside of the valve body and an outer flow path formed between an outer peripheral surface of the valve body and the housing, and the valve body is configured to have, with respect to the housing, (1) a first switching position where the first supply port and the first discharge port communicate with each other via the inner flow path and the second supply port and the second discharge port communicate with each other via the outer flow path, (2) a second switching position where the first supply port and the second discharge port communicate with each other via the outer flow path and the second supply port and the first discharge port communicate with each other via the inner flow path, (3) a third switching position where the first supply port and the first discharge port communicate with each other via the outer flow path and the second supply port and the second discharge port communicate with each other via the inner flow path, and (4) a fourth switching position where the first supply port and the second discharge port communicate with each other via the inner flow path and the second supply port and the first discharge port communicate with each other via the outer flow path.

In the valve device according to the present invention, it is preferred that the second supply port and the first supply port are arranged in the axial direction of the housing, the first discharge port and the first supply port are arranged in a circumferential direction of the housing, and the second discharge port and the second supply port are arranged in the circumferential direction of the housing, and the second discharge port and the first discharge port are arranged in the axial direction of the housing.

In the valve device according to the present invention, it is preferred that the valve body has inner ports communicating with the inner flow path, and the inner ports include a first inner port communicating with the first supply port at the first switching position and communicating with the first discharge port at the second switching position, a second inner port communicating with the second supply port at the second switching position and communicating with the second discharge port at the third switching position, a third inner port communicating with the second supply port at the third switching position and communicating with the second discharge port at the fourth switching position, and a fourth inner port communicating with the first supply port at the fourth switching position and communicating with the first discharge port at the first switching position.

In the valve device according to the present invention, it is preferred that the first supply port and the first discharge port are disposed so as to be positionally shifted by 90 degrees around the axial direction, and the second supply port and the second discharge port are disposed so as to be positionally shifted by 90 degrees around the axial direction.

In the valve device according to the present invention, it is preferred that the first inner port and the second inner port are disposed so as to be positionally shifted by 90 degrees around the axial direction, the second inner port and the third inner port are disposed so as to be positionally shifted by 90 degrees around the axial direction, and the third inner port and the fourth inner port are disposed so as to be positionally shifted by 90 degrees around the axial direction.

In the valve device according to the present invention, it is preferred that the second supply port and the first supply port are arranged in a circumferential direction of the housing, the first discharge port and the first supply port are arranged in the axial direction of the housing, and the second discharge port and the second supply port are arranged in the axial direction of the housing, and the second discharge port and the first discharge port are arranged in the circumferential direction of the housing.

In the valve device according to the present invention, it is preferred that the valve body has inner ports communicating with the inner flow path, and the inner ports include a first inner port communicating with the first supply port, at the first switching position and communicating with the second supply port at the third switching position, a second inner port communicating with the second supply port at the second switching position and communicating with the first supply port at the fourth switching position, a third inner port communicating with the second discharge port at the third switching position and communicating with the first discharge port at the first switching position, and a fourth inner port communicating with the second discharge port at the fourth switching position and communicating with the first discharge port at the second switching position.

In the valve device according to the present invention, it is preferred that the valve body includes a cylindrical peripheral wall and a plurality of protruding portions protruding outward in a radial direction from the peripheral wall to be in contact with an inner peripheral surface of the housing, and the inner ports are formed so as to penetrate through the peripheral wall and the protruding portions in the radial direction.

In the valve device according to the present invention, it is preferred that the valve device further includes a driving unit to rotationally drive the valve body only to one direction.

The second aspect of the present invention is an electrolyzed water generation device including the valve device and an electrolyzing unit electrolyzing water to produce electrolyzed water, wherein the electrolyzing, unit includes an electrolytic chamber to which the water is supplied, a first power feeder and a second power feeder having different polarities and disposed inside the electrolytic chamber, and a diaphragm dividing the electrolytic chamber into a first polarity chamber on the first power feeder side and a second polarity chamber on the second power feeder side, and the first polarity chamber is connected with the first supply port, and the second polarity chamber is connected with the second supply port.

In the electrolyzed water generation device according to the present invention, it is preferred that the electrolyzed water generation device further includes a control unit to switch the polarities of the first power feeder and the second power feeder.

Advantageous Effects of the Invention

In the valve device of the present first invention, when the valve body is at the first switching position and the second switching position with respect to the housing, the first discharge port communicates with the inner flow path, and the second discharge port communicates with the outer flow path. On the other hand, when the valve body is at the third switching position and the fourth switching position with respect to the housing, the first discharge port communicates with the outer flow path, and the second discharge port communicates with the inner flow path. Thereby, when the position of the valve body is changed from the second switching position to the third switching position and from the fourth switching position to the first switching position, the port to which the outer flow path connects and the port to which the inner flow path connects are changed. Therefore, while the fluids taken out from the first discharge port and the second discharge port are kept constant, the fluid flowing through the outer flow path and the inner flow path can be mutually changed, which allows easy suppression of precipitation and deposition of scale in the outer flow path or the inner flow path.

In the electrolyzed water generation device of the present second invention, it is possible that electrolyzed water produced in the first polarity chamber is supplied to the first supply port and taken out from the first discharge port and the second discharge port. Further, it is possible that electrolyzed water produced in the second polarity chamber is supplied to the second supply port and taken out from the second discharge port and the first discharge port.

DETAILED DESCRIPTION OF THE INVENTION

In the following, one embodiment of the first invention is described in conjunction with accompanying drawings.

Figure 1:
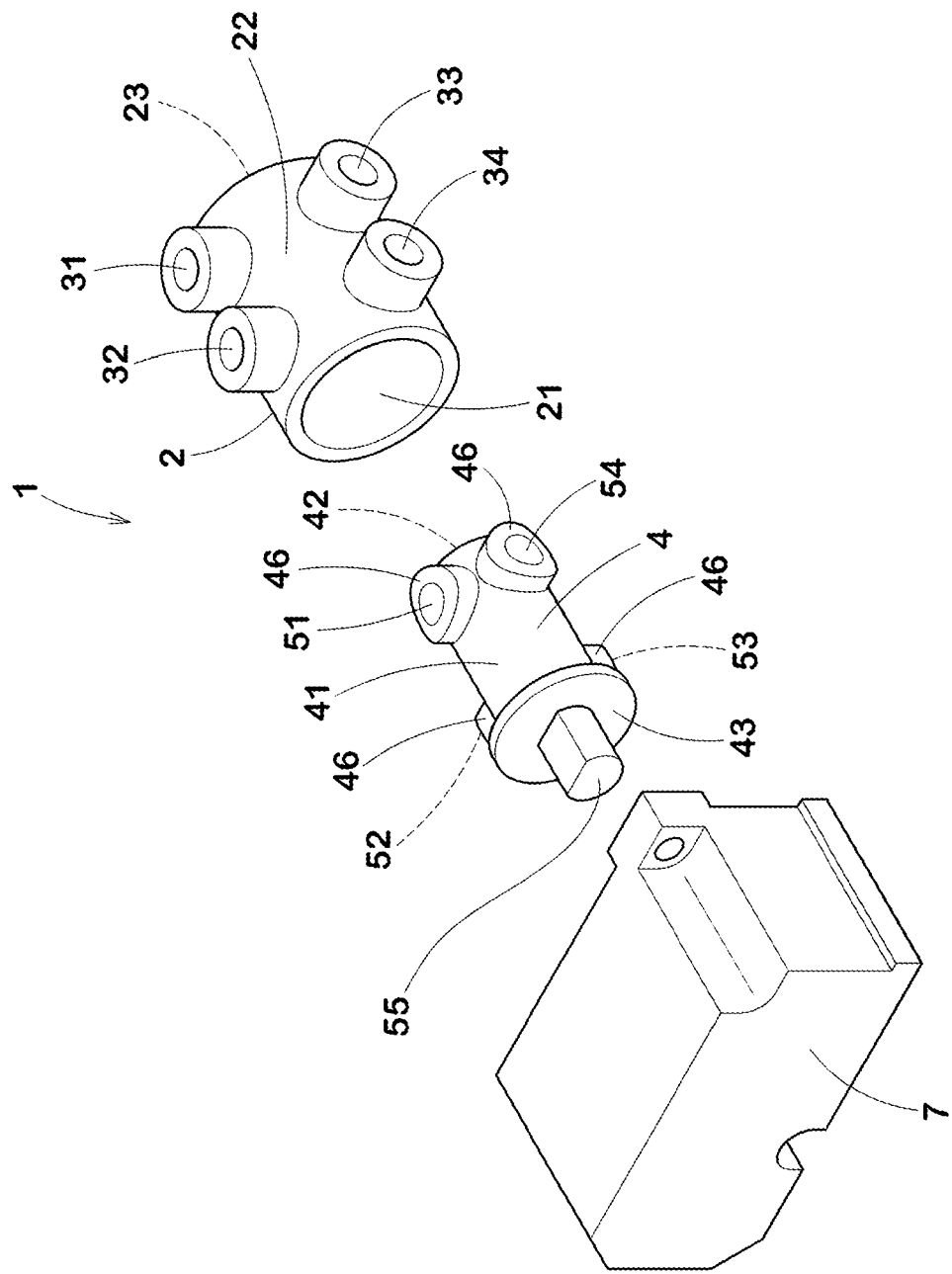
FIG. 1 A diagram showing a schematic configuration of the valve device of the present first invention before assembly.

FIG. 1 depicts a schematic configuration of a valve device of the present embodiment. A valve device 1 includes a housing 2 which defines a space 21 therein and a valve body 4 to be disposed inside the space 21 of the housing 2.

The housing 2 has a peripheral wall 22 formed in a cylindrical shape and a side wall 23 formed at an end edge on one side of the peripheral wall 22. The end edge of on the one side of the peripheral wall 22 is closed by the side wall 23, and an end edge on the other side is open so as to allow the valve body 4 to be inserted.

In the housing 2, a first supply port 31, a second supply port 32, a first discharge port 33, and a second discharge port 34 each communicating with the space 21 are formed. Each of the first supply port 31, the second supply port 32, the first discharge port 33, and the second discharge port 34 is formed as a through hole penetrating though the peripheral wall 22 of the housing 2.

Figure 2:
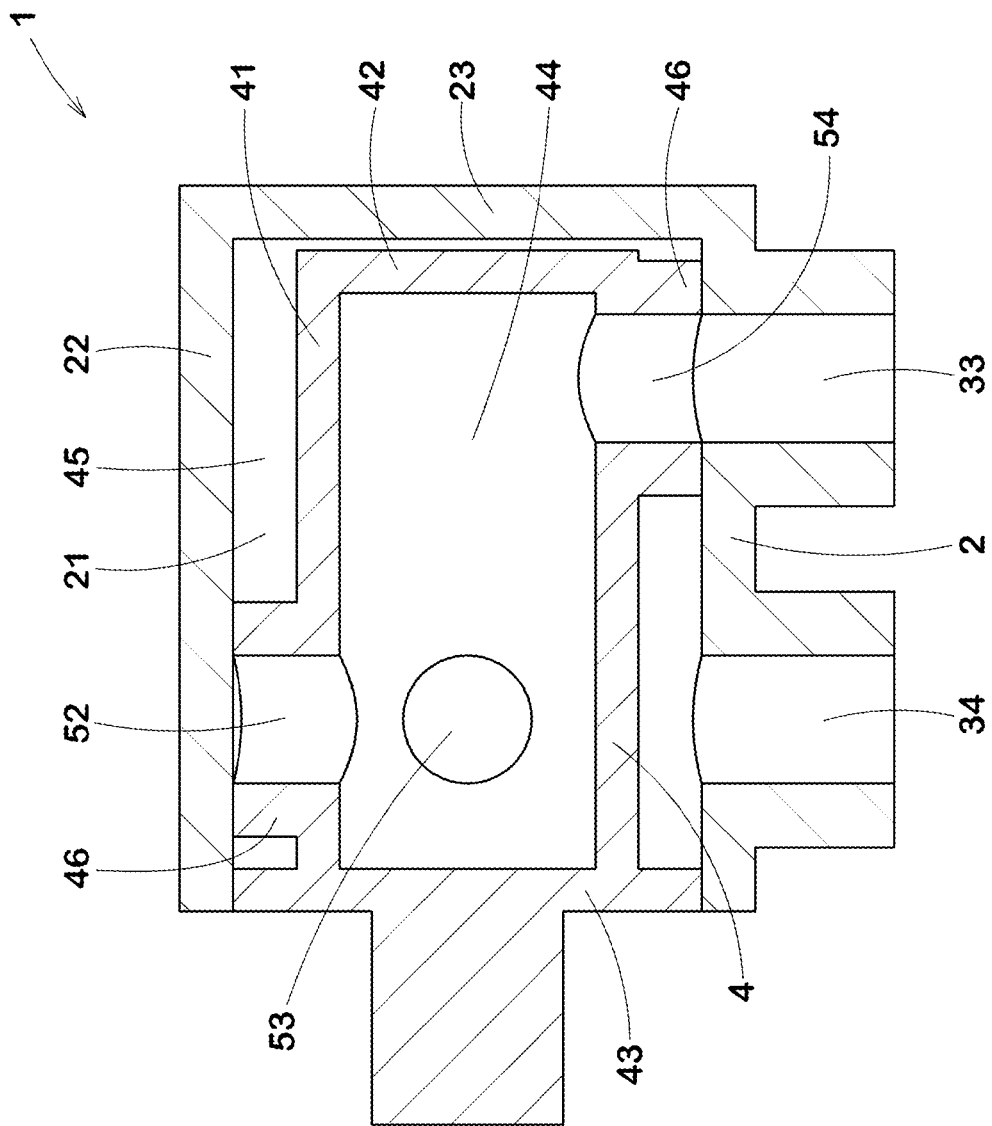
FIG. 2 A cross section passing through the first discharge port and the second discharge port.
Figure 3:
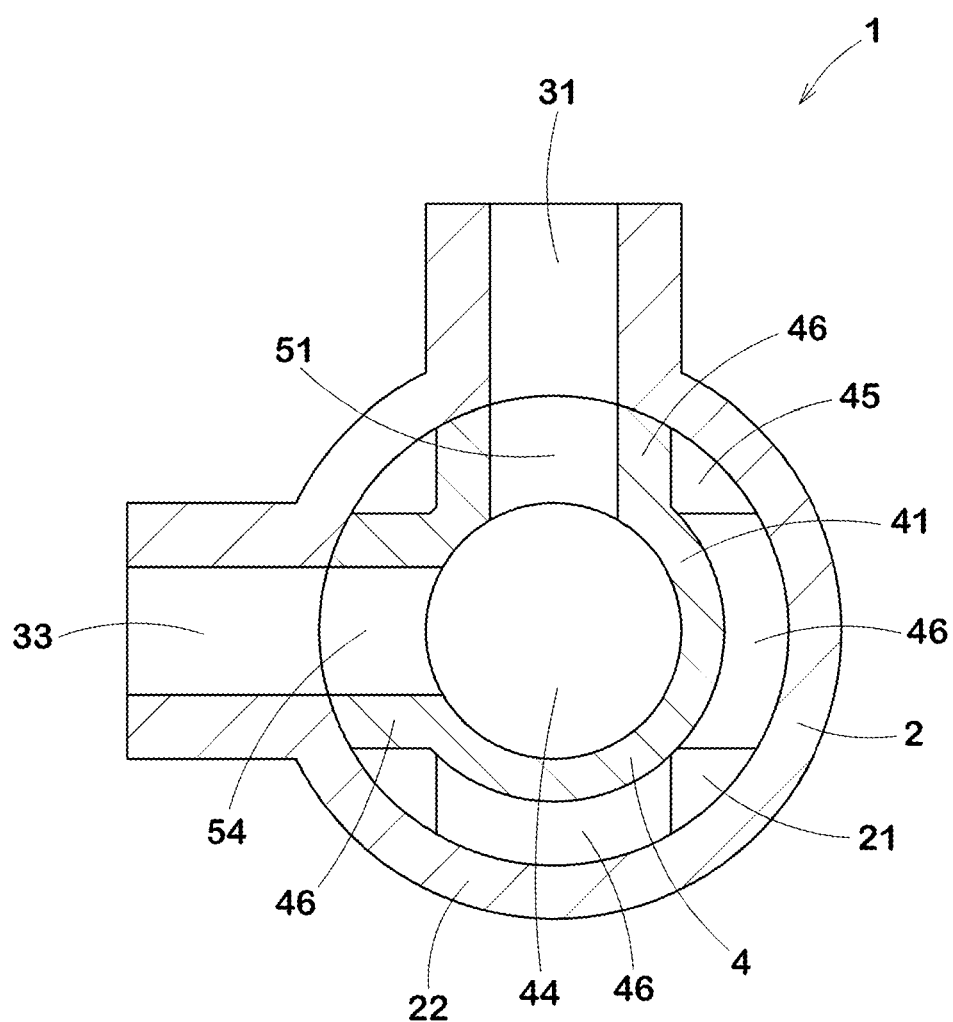
FIG. 3 A cross section passing through the first supply port and the first discharge port.
Figure 4:
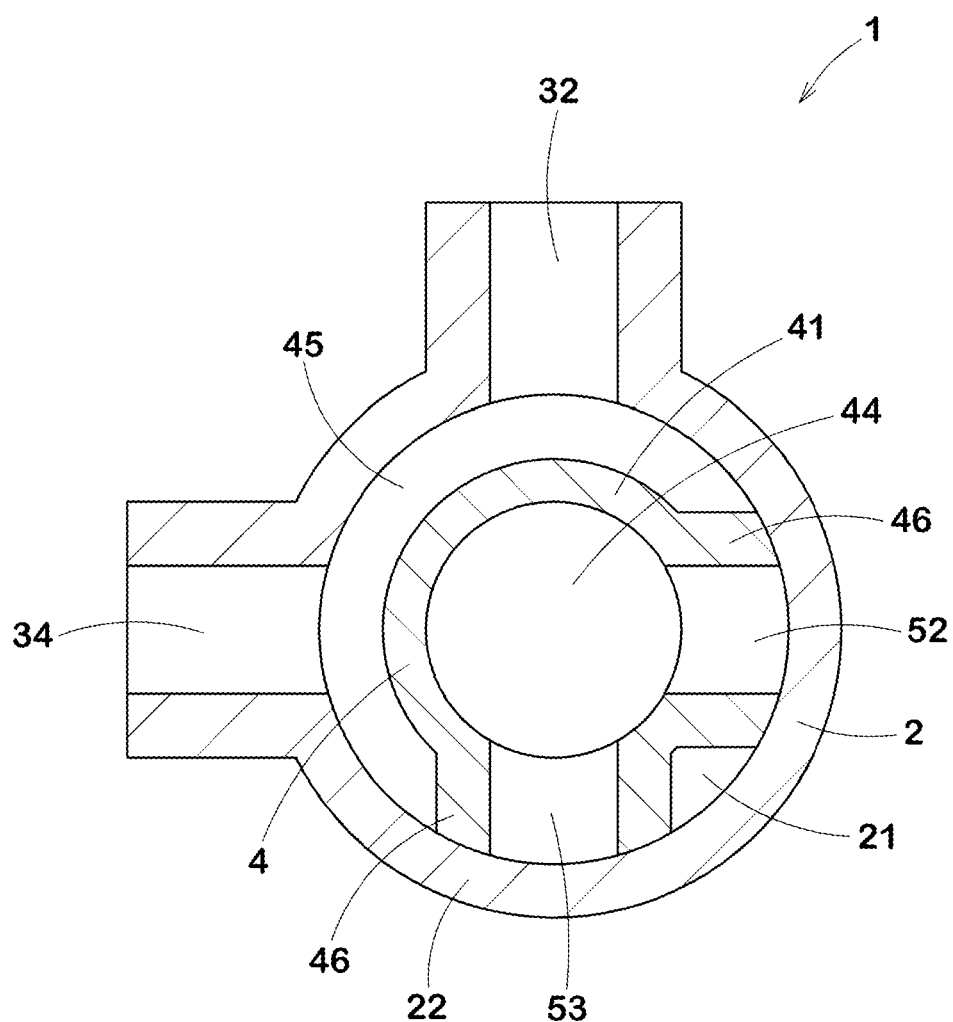
FIG. 4 A cross section passing through the second supply port and the second discharge port.

FIG. 2 depicts a cross section taken parallel to an axis of the housing 2 and passing through the first discharge port 33 and the second discharge port 34. FIG. 3 depicts a cross section taken perpendicular to the axis of the housing 2 and passing through the first supply port 31 and the first discharge port 33, and FIG. 4 depicts a cross section taken perpendicular to the axis of the housing 2 and passing through the second supply port 32 and the second discharge port 34.

The valve body 4 is disposed so as to be rotatable around the axis. In the present embodiment, the valve body 4 is formed in a cylindrical shape having a diameter smaller than that of the housing 2. The valve body 4 has a peripheral wall 41 formed in a cylindrical shape and side walls 42 and 43 formed at both end edges of the peripheral wall 41. The end edge on one side of the peripheral wall 41 is closed with the side wall 42, and the end edge on the other side is closed with the side wall 43.

The valve body 4 is provided with an inner flow path 44 extending so as to penetrate through the inside of the valve body 4 and an outer flow path 45 formed between the peripheral wall 41 (outer peripheral surface) of the valve body 4 and the housing 2 (inner peripheral surface).

The valve body 4 has a first switching position P1, a second switching position P2, a third switching position P3, and a fourth switching position P4 (refer to FIGS. 5 to 8 described further below), with respect to the housing 2. The first switching position P1 to the fourth switching position P4 each has a different orientation (rotational angle position) of the valve body 4 with respect to the housing 2.

Figure 5:
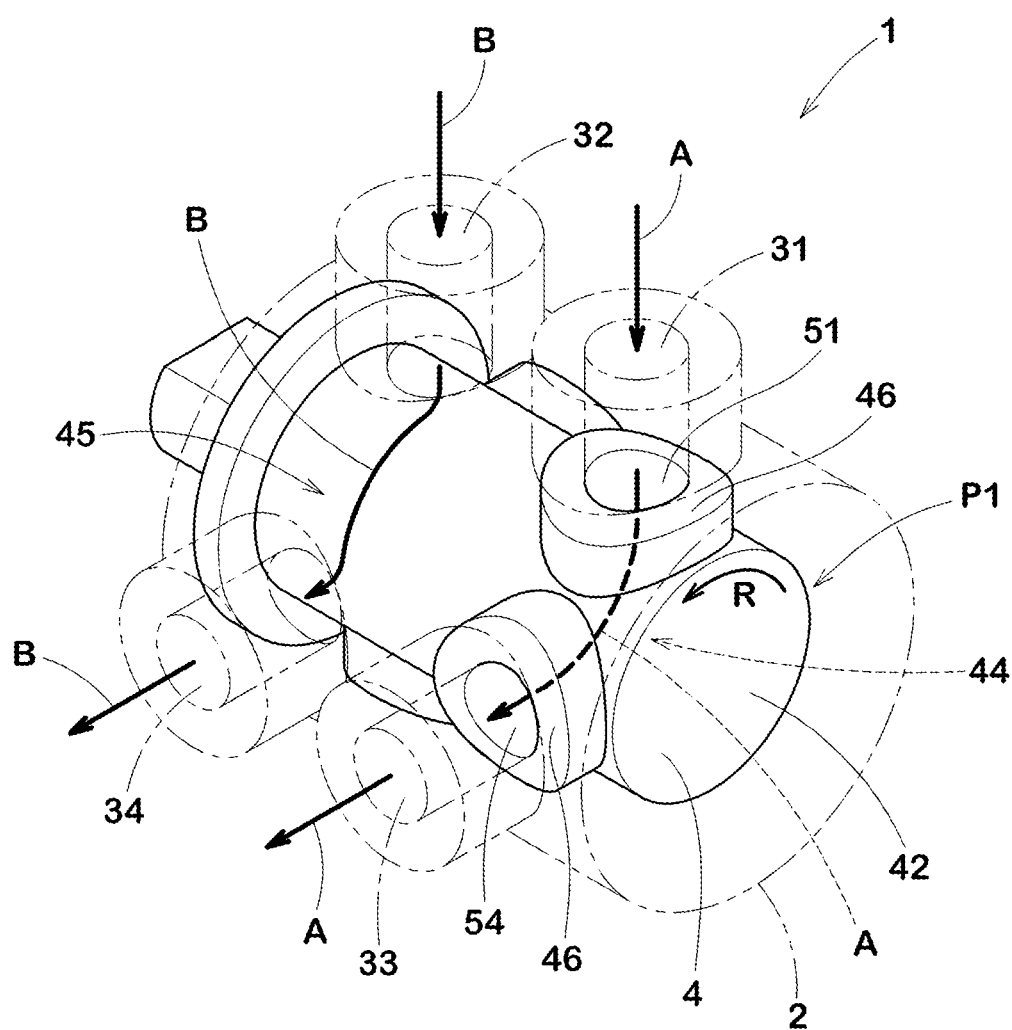
FIG. 5 A perspective view of the valve device with the valve body at the first switching position.

FIG. 5 depicts the valve device 1 with the valve body 4 at the first switching position P1 with respect to the housing 2. In the drawing, in order to allow the valve body 4 to be seen through, the housing 2 is indicated by two-dot-chain lines (hereinafter, the same applies to FIG. 6 through FIG. 8). It should be noted that FIGS. 2 to 4 each depict a cross section of the valve device 1 with the valve body 4 at the first switching position P1. The first switching position PT is applied when a fluid (A) is supplied from the first supply port 31 and taken out from the first discharge port 33 and a fluid (B) is supplied from the second supply port 32 and taken out from the second discharge port 34.

At the first switching position P1, the first supply port 31 and the first discharge port 33 communicate with each other via the inner flow path 44. Therefore, the fluid (A) supplied from the first supply port 31 flows via the inner flow path 44 into the first discharge port 33, and is taken out from the first discharge port 33. On the other hand, the second supply port 32 and the second discharge port 34 communicate with each other via the outer flow path 45. Therefore, the fluid (B) supplied from the second supply port 32 flows via the outer flow path 45 into the second discharge port 34, and is taken out from the second discharge port 34.

Figure 6:
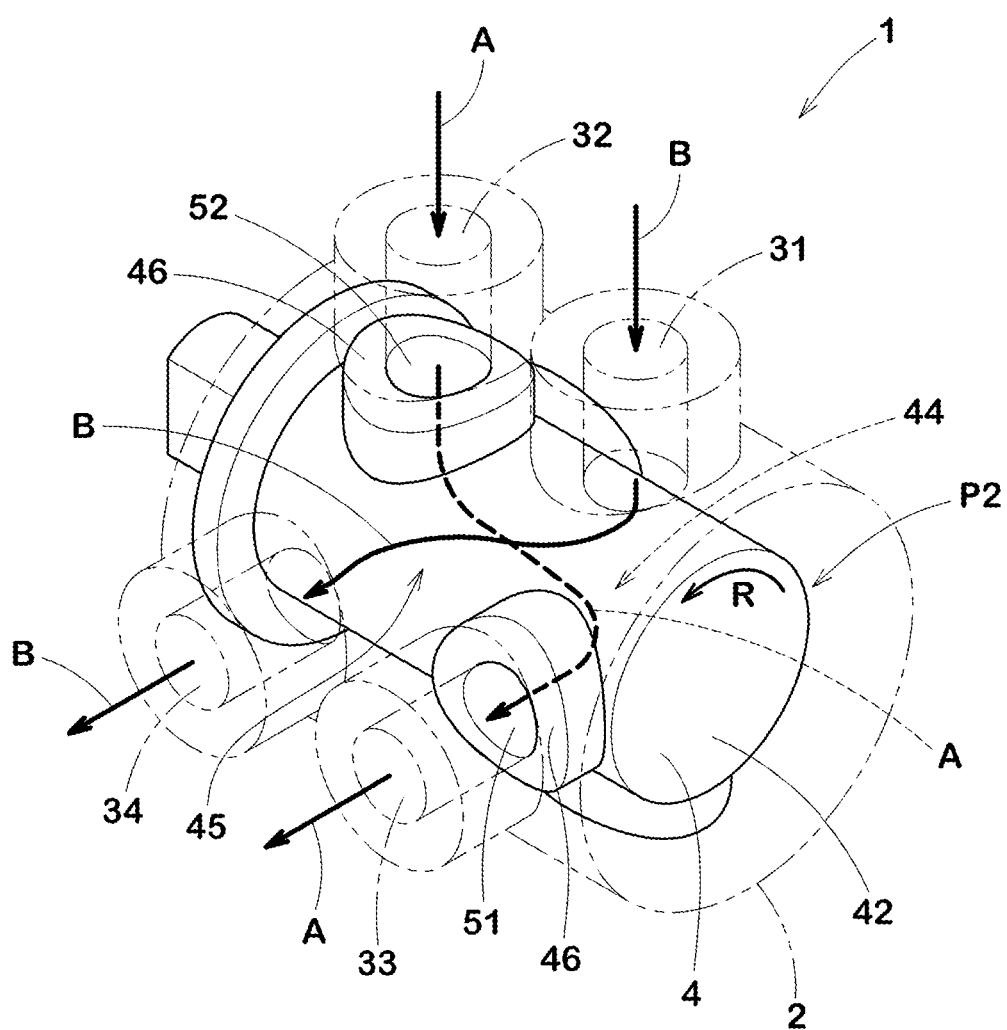
FIG. 6 A perspective view of the valve device with the valve body at the second switching position.

FIG. 6 depicts the valve device 1 with the valve body 4 at the second switching position P2 with respect to the housing 2. The second switching position P2 is a position after the valve body 4 is rotated by 90 degrees counterclockwise (in the drawing, with an arrow (R) direction taken as positive) with respect to the first switching position P1 when viewed in an axial direction from the side wall 42. The second switching position P2 is applied when the fluid (B) is supplied from the first supply port 31 and taken out from the second discharge port 34 and the fluid (A) is supplied from the second supply port 32 and taken out from the first discharge port 33.

At the second switching position P2, the first supply port 31 and the second discharge port 34 communicate with each other via the outer flow path 45. Therefore, the fluid (B) supplied from the first supply port 31 flows via the outer flow path 45 into the second discharge port 34, and is taken out from the second discharge port 34. On the other hand, the second supply port 32 and the first discharge port 33 communicate with each other via the inner flow path 44. Therefore, the fluid (A) supplied from the second supply port 32 flows via the inner flow path 44 into the first discharge port 33, and is taken out from the first discharge port 33.

Figure 7:
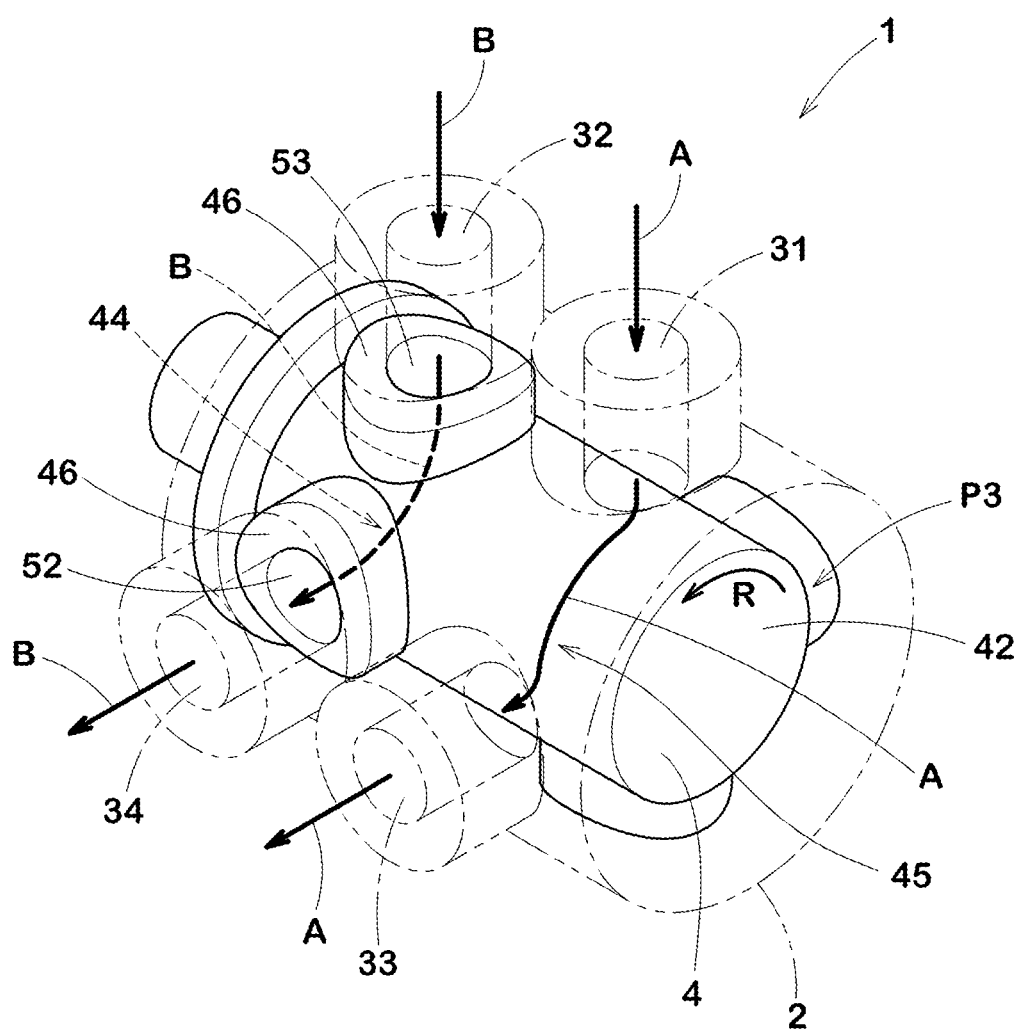
FIG. 7 A perspective view of the valve device with the valve body at the third switching position.

FIG. 7 depicts the valve device 1 with the valve body 4 at the third switching position P3 with respect to the housing 2. The third switching position P3 is a position after the valve body 4 is rotated by 90 degrees counterclockwise with respect to the second switching position P2 when viewed in the direction from the side wall 42. The third switching position P3 is applied when the fluid (A) is supplied from the first supply port 31 and taken out from the first discharge port 33 and the fluid (B) is supplied from the second supply port 32 and taken out from the second discharge port 34.

At the third switching position P3, the first supply port 31 and the first discharge port 33 communicate with each other via the outer flow path 45. Therefore, the fluid (A) supplied from the first supply port 31 flows via the outer flow path 45 into the first discharge port 33, and is taken out from the first discharge port 33. On the other hand, the second supply port 32 and the second discharge port 34 communicate with each other via the inner flow path 44. Therefore, the fluid (B) supplied from the second supply port 32 flows via the inner flow path 44 into the second discharge port 34, and is taken out from the second discharge port 34.

Figure 8:
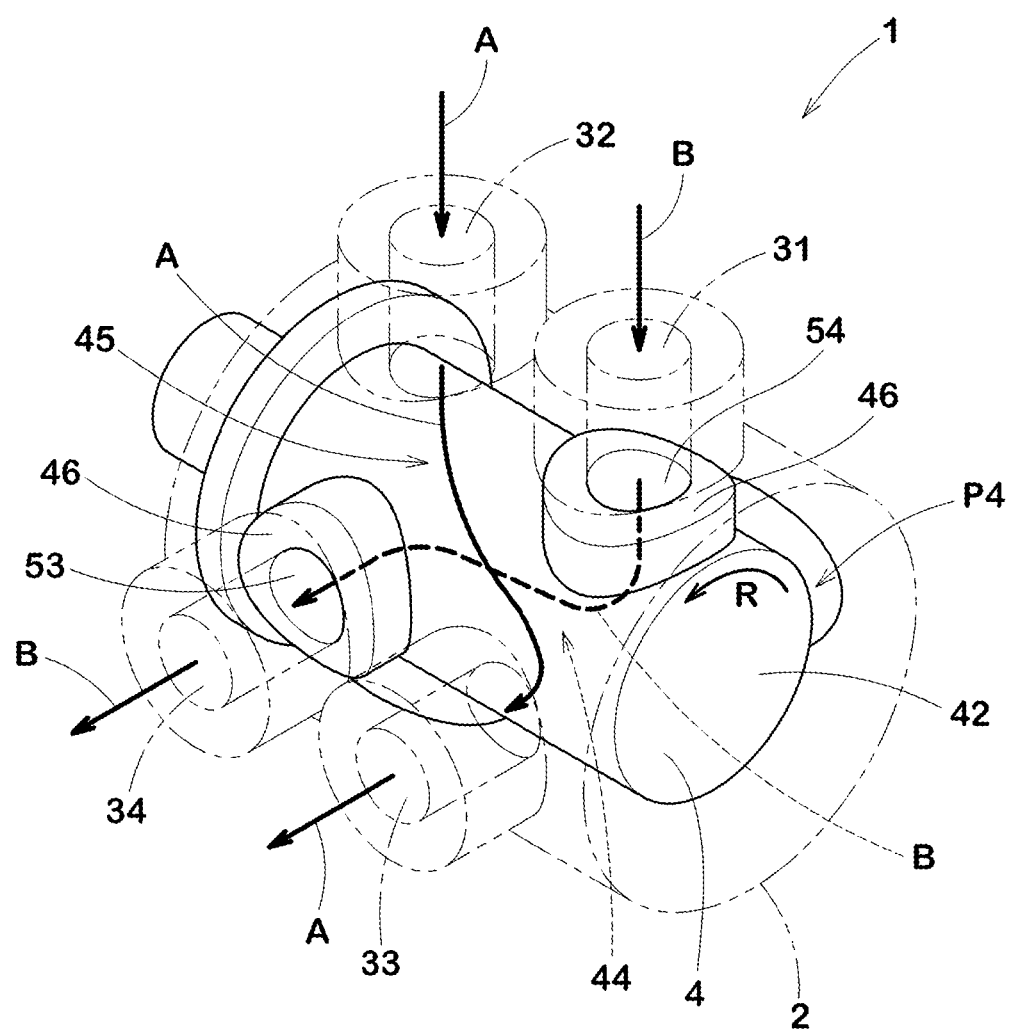
FIG. 8 A perspective view of the valve device with the valve body at the fourth switching position.

FIG. 8 depicts the valve device 1 with the valve body 4 at the fourth switching position P4 with respect to the housing 2. The fourth switching position P4 is a position after the valve body 4 is rotated by 90 degrees counterclockwise with respect to the third switching position P3 when viewed in the direction from the side wall 42. The second switching position P2 is applied when the fluid (B) is supplied from the first supply port 31 and taken out from the second discharge port 34 and the fluid (A) is supplied from the second supply port 32 and taken out from the first discharge port 33.

At the fourth switching position P4, the second supply port 32 and the first discharge port 33 communicate with each other via the outer flow path 45. Therefore, the fluid (A) supplied from the second supply port 32 flows via the outer flow path 45 into the first discharge port 33, and is taken out from the first discharge port 33. On the other hand, the first supply port 31 and the second discharge port 34 communicate with each other via the inner flow path 44. Therefore, the fluid (B) supplied from the first supply port 31 flows via the inner flow path 44 into the second discharge port 34, and is taken out from the second discharge port 34.

In the valve device 1 of the present embodiment, as depicted in FIGS. 5 and 6, when the valve body 4 is at the first switching position P1 and the second switching position P2 with respect to the housing 2, the first discharge port 33 communicates with the inner flow path 44 and the second discharge port 34 communicates with the outer flow path 45. On the other hand, as depicted in FIGS. 7 and 8, when the valve body 4 is at the third switching position P3 and the fourth switching position P4 with respect to the housing 2, the first discharge port 33 communicates with the outer flow path 45 and the second discharge port 34 communicates with the inner flow path 44. Thereby, when the position of the valve body 4 is changed from the second switching position P2 to the third switching position P3 and from the fourth switching position P4 to the first switching position P1, the port to which the outer flow path 45 connects and the port to which the inner flow path 44 connects are changed. Therefore, while the fluid (A) taken out from the first discharge port 33 and the fluid (B) taken out from the second discharge port 34 are kept constant, the fluid (A) or the fluid (B) flowing through the outer flow path 45 and the inner flow path 44 can be mutually changed. Therefore, it is possible that precipitation and deposition of scale in the outer flow path 45 or the inner flow path 44 is easily suppressed.

In the valve device 1 of the present embodiment, the second supply port 32 is disposed aside of the first supply port 31 in an axial direction of the housing 2. Further, the first discharge port 33 is disposed aside of the first supply port 31 in a circumferential direction of the housing 2, and the second discharge port 34 is disposed aside of the second supply port 32 in the circumferential direction of the housing 2 and aside of the first discharge port 33 in the axial direction of the housing 2. Due to such an arrangement, the first supply port 31 and the second supply port 32 are arranged side by side in the axial direction, and the first discharge port 33 and the second discharge port 34 are also arranged side by side in the axial direction. Therefore, the first supply port 31, the second supply port 32, the first discharge port 33, and the second discharge port 34 can be orderly coordinated in compact form, which facilitates designing of the valve device 1.

As depicted in FIGS. 1 to 8, the valve body 4 has a plurality of inner ports 51, 52, 53, and 54 each communicating with the inner flow path 44.

As depicted in FIGS. 5 and 6, the first inner port 51 communicates with the first supply port 31 at the first switching position P1, and communicates with the first discharge port 33 at the second switching position P2. As depicted in FIGS. 6 and 7, the second inner port 52 communicates with the second supply port 32 at the second switching position P2, and communicates with the second discharge port 34 at the third switching position P3. As depicted in FIGS. 7 and 8, the third inner port 53 communicates with the second supply port 32 at the third switching position P3, and communicates with the second discharge port 34 at the fourth switching position P4. As depicted in FIGS. 8 and 5, the fourth inner port 54 communicates with the first supply port 31 at the fourth switching position P4, and communicates with the first discharge port 33 at the first switching position P1.

By the above-described inner ports 51, 52, 53, and 54, the first supply port 31, the second supply port 32, the first discharge port 33, and the second discharge port 34 appropriately communicate with the inner flow path 44 or the outer flow path 45 at the respective switching positions.

The valve body 4 of the present embodiment includes a plurality of protruding portions 46 protruding outward in a radial direction of the valve body from the peripheral wall 41. An end face of each of the protruding portions 46 is in contact with the inner peripheral surface of the peripheral wall 22. And, each of the inner ports 51, 52, 53, and 54 is formed so as to penetrate through the peripheral wall 41 and a respective one of the protruding portions 46 in the radial direction. Thereby, airtightness between the inner flow path 44 and the outer flow path 45 is easily increased. Further, the outer flow path 45 is easily formed between the peripheral wall 22 of the housing 2 and the peripheral wall 41 of the valve body 4.

At peripheral positions of the first supply port 31, the second supply port 32, the first discharge port 33, and the second discharge port 34, a plurality of protruding portions (not depicted in the drawings) protruding inward in a radial direction of the housing from the peripheral wall 22. In this case, the protruding portions 46 of the valve body 4 are not required. Note that the outer flow path 45 may be formed by making part of the peripheral wall 22 or the peripheral wall 41 recessed in a groove shape.

In the present valve device 1, the first supply port 31 and the first discharge port 33 are disposed so as to be positionally shifted by 90 degrees from each other around the axial direction. Further, the second supply port 32 and the second discharge port 34 are disposed so as to be positionally shifted by 90 degrees from each other around the axial direction. With this, it is possible that the first supply port 31 and the first discharge port 33, and the second supply port 32 and the second discharge port 34 are easily arranged with appropriate spacing. It should be noted that the shift angle between the first supply port 31 and the first discharge port 33 and the shift angle between the second supply port 32 and the second discharge port 34 are not limited to 90 degrees, and may be an angle near 90 degrees, for example.

Furthermore, in the present valve device 1, the first inner port 51 and the second inner port 52 are disposed so as to be positionally shifted by 90 degrees around the axial direction. Further, the second inner port 52 and the third inner port 53 are disposed so as to be positionally shifted by 90 degrees around the axial direction. Furthermore, the third inner port 53 and the fourth inner port 54 are disposed so as to be positionally shifted by 90 degrees around the axial direction. Thereby, around the axial direction with respect to the first inner port 51, with the arrow (R) direction taken as positive, the second inner port 52 is disposed so as to be positionally shifted by 90 degrees, the third inner port 53 is disposed so as to be positionally shifted by 180 degrees, and the fourth inner port 54 is disposed so as to be positionally shifted by 270 degrees (−90 degrees).

Due to the above-described arrangement of the first supply port 31 and the first discharge port 33, and the second supply port 32 and the second discharge port 34, in combination with the above-described arrangement of the inner ports 51, 52, 53, and 54, it is possible that the valve body 4 is positioned at the first switching position P1, the second switching position P2, the third switching position P3, and the fourth switching position P4 sequentially by rotating the valve body 4 by 90 degrees counterclockwise when viewed in the direction from the side wall 42. It should be noted that the shift angle between the first inner port 51 and the second inner port 52, the shift angle between the second inner port 52 and the third inner port 53, the shift angle between the third inner port 53 and the fourth inner port 54, and the shift angle between the fourth inner port 54 and the first inner port 51 are also not limited to 90 degrees, and may be, for example, an angle near 90 degrees.

At the first switching position P1, it is at least required that the first supply port 31 and the first discharge port 33 communicate with each other via the inner flow path 44 and the second supply port 32 and the second discharge port 34 communicate with each other via the outer flow path 45. Further, at the second switching position P2, it is at least required that the first supply port 31 and the second discharge port 34 communicate with each other via the outer flow path 45 and the second supply port 32 and the first discharge port 33 communicate with each other via the inner flow path 44. Therefore, the rotational angle required for switching from the first switching position P1 to the second switching position P2 is not limited to 90 degrees, and may be any rotational angle ensuring the above-described port communication state (for example, an angle near 90 degrees). The same goes for the rotational angle required for switching from the second switching position P2 to the third switching position P3, the rotational angle required for switching from the third switching position P3 to the fourth switching position P4, and the rotational angle required for switching from the fourth switching position P4 to the first switching position P1.

Further, the present valve device 1 may be of an embodiment in which the valve body 4 is rotated by 90 degrees clockwise when viewed in the axial direction from the side wall 42. In this case, it is possible that the valve body 4 is positioned at the first switching position P1, the fourth switching position P4, the third switching position P3, and the second switching position P2 sequentially.

As depicted in FIG. 1, the valve device 1 has a driving unit 7 for rotationally driving the valve body 4. The driving unit 7 is provided at the open end edge on the other side of the housing 2. As the driving unit 7, a motor (not depicted in the drawings) is employed, for example. The motor is coupled with a rotating shaft 55 of the valve body 4 to rotationally drive the rotating shaft 55.

The driving unit 7 of the present embodiment rotationally drives the valve body 4 only in one direction. More specifically, the driving unit 7 rotationally drives the valve body 4 only in one direction by 90 degrees. In FIG. 1, the driving unit 7 rotationally drives the valve body 4 by 90 degrees clockwise when viewed in the axial direction from the side wall 43. This allows the valve body 4 to be positioned at the first switching position P1, the second switching position P2, the third switching position P3, and the fourth switching position P4 sequentially by simple control.

In the following, one embodiment of the second invention will be described in conjunction with accompanying drawings.

Figure 9:
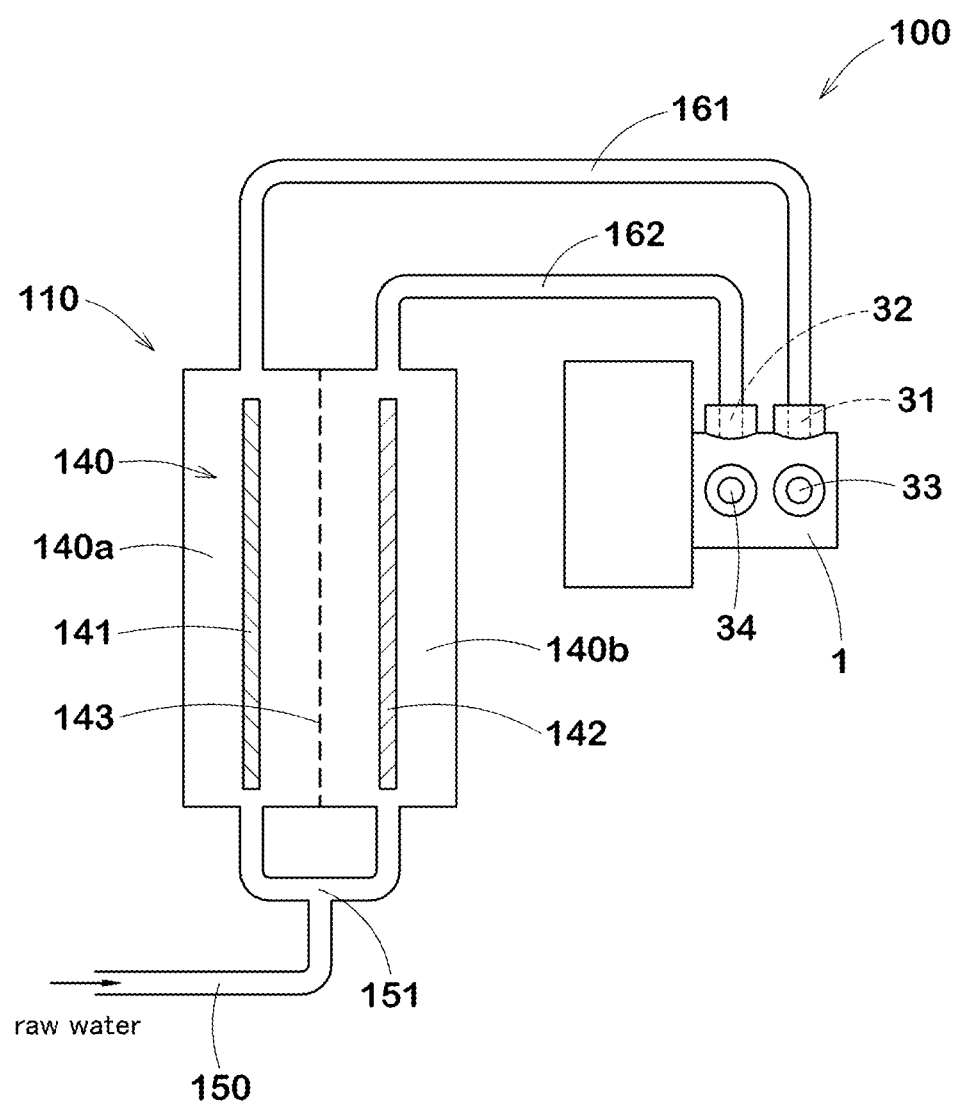
FIG. 9 A diagram showing a flow path configuration of the electrolyzed water generation device of the present second invention.

FIG. 9 depicts a schematic configuration of an electrolyzed water generation device 100 of the present embodiment.

The electrolyzed water generation device 100 includes the valve device 1 and an electrolyzing unit 110 to produce electrolyzed water by electrolysis.

The electrolyzing unit 110 includes: an electrolytic chamber 140 to which raw water for electrolysis is supplied; and a first power feeder 141, a second power feeder 142, and a diaphragm 143 disposed inside the electrolytic chamber 140. The first power feeder 141 and the second power feeder 142 are disposed with the diaphragm 143 therebetween, and function as electrodes with polarities different from each other.

The diaphragm 143 divides the electrolytic chamber 140 into a first polarity chamber (140a) on the first power feeder 141 side and a second polarity chamber (140b) on the second power feeder 142 side. As the diaphragm 143, a polytetrafluoroethylene (PTFE) hydrophilic diaphragm is used, for example.

On an upstream side of the electrolytic chamber 140, a water inlet pipe 150 for supplying raw water to the electrolytic chamber 140 is provided. On an upstream side of the water inlet pipe 150, a water purification cartridge (not depicted in the drawing) for purifying raw water is provided as required. The water inlet pipe 150 connects the water purification cartridge with the electrolytic chamber 140.

The water inlet pipe 150 is branched at a branching part 151 on a downstream side thereof to be connected to the first polarity chamber (140a) and the second polarity chamber (140b). The water inlet pipe 150 supplies raw water to the first polarity chamber (140a) and the second polarity chamber (140b).

When a DC voltage is applied between the first power feeder 141 and the second power feeder 142 in a state in which the electrolytic chamber 140 is filled with raw water, the raw water is electrolyzed inside the electrolytic chamber 140 to produce alkaline electrolytic hydrogen water in the electrolytic chamber 140 on a cathode side and electrolytic acidic water in the electrolytic chamber 140 on an anode side.

To a downstream side of the electrolytic chamber 140, water outlet pipes 161 and 162 are connected. The water outlet pipe 161 connects the first polarity chamber (140a) and the first supply port 31 together. That is, the first polarity chamber (140a) is connected to the first supply port 31 via the water outlet pipe 161. On the other hand, the water outlet pipe 162 connects the second polarity chamber (140b) and the second supply port 32 together. That is, the second polarity chamber (140b) is connected to the second supply port 32 via, the water outlet pipe 162.

The first discharge port 33 is connected to a drainpipe (not depicted in the drawing), for example. Electrolytic water flowing into the drainpipe is electrolyzed water not selected by the user, and is flown out as waste water to a kitchen sink, for example. The second discharge port 34 is connected to a water intake pipe (not depicted in the drawing), for example. Electrolytic water flowing into the water intake pipe is electrolyzed water selected by the user, and is taken out to a container such as a cup, for example. The first discharge port 33 may be connected to the water intake pipe, and the second discharge port 34 may be connected to the drainpipe.

Figure 10:
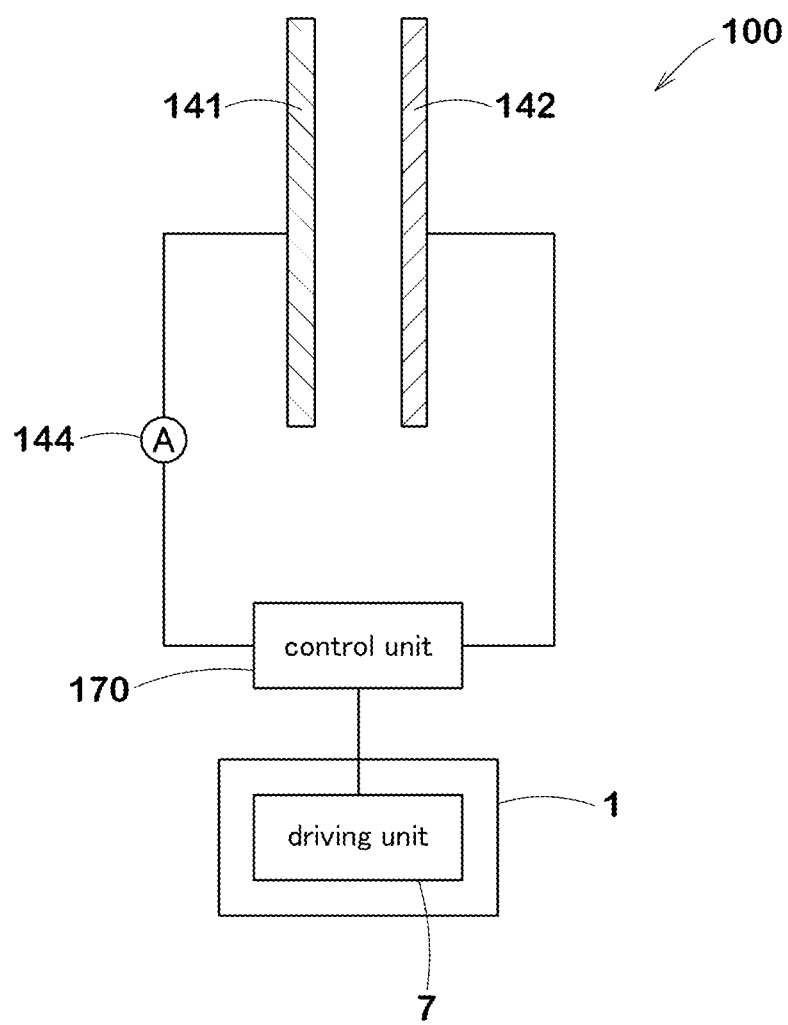
FIG. 10 A diagram showing an electrical configuration of the electrolyzed water generation device.

FIG. 10 depicts an electrical configuration of the electrolyzed water generation device 100. The electrolyzed water generation device 100 includes a control unit 170 which is responsible for controlling each unit. As depicted in FIG. 10, the first power feeder 141, the second power feeder 142, and the control unit 170 are connected via a current supply line. The current supply line between the first power feeder 141 and the control unit 170 is provided with a current detector 144. The current detector 144 may be provided in the current supply line between the second power feeder 142 and the control unit 170. The current detector 144 detects a direct current (electrolytic current) to be supplied to the first power feeder 141 and the second power feeder 142, and outputs an electrical signal corresponding to that value of the detected current to the control unit 170.

The control unit 170 has, for example, a CPU (Central Processing Unit) which performs various arithmetic processing, information processing, and so forth; a program responsible for the operation of the CPU; a memory which stores various information; and so forth. Various functions of the control unit 170 are implemented by the CPU, the memory, and the program.

The control unit 170 controls, based on the electrical signal outputted from the current detector 144, a DC voltage (electrolytic voltage) to be applied to the first power feeder 141 and the second power feeder 142 so that the electrolytic current has a desired value, for example.

The polarities of the first power feeder 141 and the second power feeder 142 are controlled by the control unit 170. That is, the control unit 170 functions as a polarity switcher which switches the polarities of the first power feeder 141 and the second power feeder 142.

Of the first power feeder 141 and the second power feeder 142, electrolytic acidic water produced in the electrolytic chamber 140 on the anode side is supplied to the valve device 1 as the fluid (A) in FIGS. 5 to 8. Similarly, of the first power feeder 141 and the second power feeder 142, electrolytic acidic water produced in the electrolytic chamber 140 on the cathode side is supplied to the valve device 1 as the fluid (B) in FIGS. 5 to 8.

As already described, the first polarity chamber (140a) and the first supply port 31 are connected via the water outlet pipe 161, and the second polarity chamber (140b) and the second supply port 32 are connected via the water outlet pipe 162. Therefore, switching between the fluid (A) and the fluid (B) to be supplied to the first supply port 31 and the second supply port 32 in FIGS. 5 to 8 is achieved by switching the polarities of the first power feeder 141 and the second power feeder 142 by the control unit 170.

It should be noted that in the following, in FIGS. 5 to 8, description will be made of the electrolyzed water generation device 100 in operation in "electrolytic hydrogen water mode" of taking out electrolytic hydrogen water from the second discharge port 34 as the fluid (B). "Electrolytic acidic water mode" of taking out electrolytic acidic water from the second discharge port 34 as the fluid (B) can be achieved by, for example, switching only the polarities of the first power feeder 141 and the second power feeder 142 independently from the position of the valve body 4. Alternatively, it can be achieved by switching only the position of the valve body 4 independently from the polarities of the first power feeder 141 and the second power feeder 142.

The control unit 170 controls the driving unit 7 of the valve device 1. More specifically, the control unit 170 controls the position of the valve body 4 so as to be synchronized with switching the polarities of the first power feeder 141 and the second power feeder 142. Therefore, when the position of the valve body 4 is changed from the second switching position P2 to the third switching position P3 and from the fourth switching position P4 to the first switching position P1, the fluid flowing through the inner flow path 44 and the outer flow path 45 is switched between electrolytic hydrogen water and electrolytic acidic water. Therefore, scale deposited in the inner flow path 44, the outer flow path 45, or the like due to flowing of electrolytic hydrogen water produced in the electrolytic chamber 140 on the cathode side is removed by flowing of electrolytic acidic water produced in the electrolytic chamber 140 on the anode side.

On the other hand, as depicted in FIGS. 5 to 8, regardless of the position of the valve body 4 among the first switching position P1 through the fourth switching position P4, the fluid (A) of electrolytic acidic water is always taken out from the first discharge port 33, and the fluid (B) of electrolytic hydrogen water is always taken out from the second discharge port 34. Therefore, deposition of scale in the inner flow path 44, the outer flow path 45, and the like is suppressed without impairing user convenience.

FIG. 11 to FIG. 14 depict states of a valve device 1A, which is a modification example of the valve device 1, at the first switching position P1 to the fourth switching position P4, respectively. In the valve device 1A, the above-described configuration of the valve device 1 can be adopted for portions not described in the following.

In the valve device 1A, the arrangement of the first supply port 31, the second supply port 32, the first discharge port 33, and the second discharge port 34 is changed from the valve device 1. Accordingly, the arrangement of the first inner port 51, the second inner port 52, the third inner port 53, and the fourth inner port 54 is also changed.

In the valve device 1A of the present embodiment, the second supply port 32 is disposed aside of the first supply port 31 in the circumferential direction of the housing 2. Further, the first discharge port 33 is disposed aside of the first supply port 31 in the axial direction of the housing 2, the second discharge port 34 is disposed aside of the second supply port 32 in the axial direction the housing 2 and aside of the first discharge port 33 in the circumferential direction of the housing 2. Due to such an arrangement, the first supply port 31 and the second supply port 32 are arranged together on one side in the axial direction of the housing 2, and the first discharge port 33 and the second discharge port 34 are arranged together on the other side in the axial direction of the housing 2. Therefore, it is possible that the first supply port 31, the second supply port 32, the first discharge port 33, and the second discharge port 34 are orderly coordinated in compact form, which facilitates designing of the valve device 1.

Further, the first supply port 31 and the second supply port 32 are disposed so as to be positionally shifted by 180 degrees around the axial direction. Furthermore, the first discharge port 33 and the second discharge port 34 are disposed so as to be positionally shifted by 180 degrees around the axial direction. Therefore, it is possible that the first supply port 31 and the second supply port 32, and the first discharge port 33 and the second discharge port 34 are easily arranged with appropriate spacing.

It should be noted that the shift angle between the first supply port 31 and the second supply port 32 and the shift angle between the first discharge port 33 and the second discharge port 34 are not limited to 180 degrees and may be an angle near 180 degrees, for example.

Figure 11:
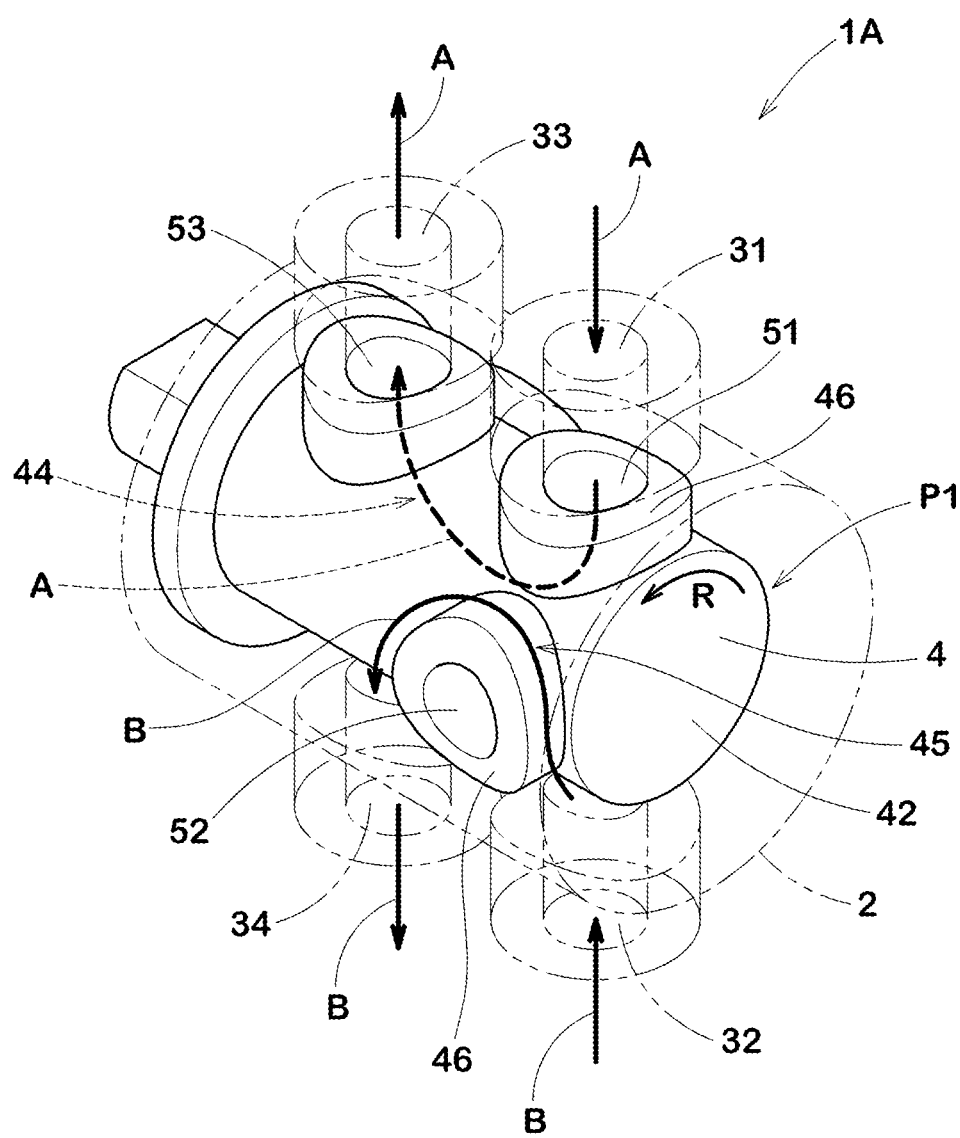
FIG. 11 A perspective view of the valve device as a modification example of the valve device shown in FIGS. 1 to 8 with the valve body at the first switching position.
Figure 12:
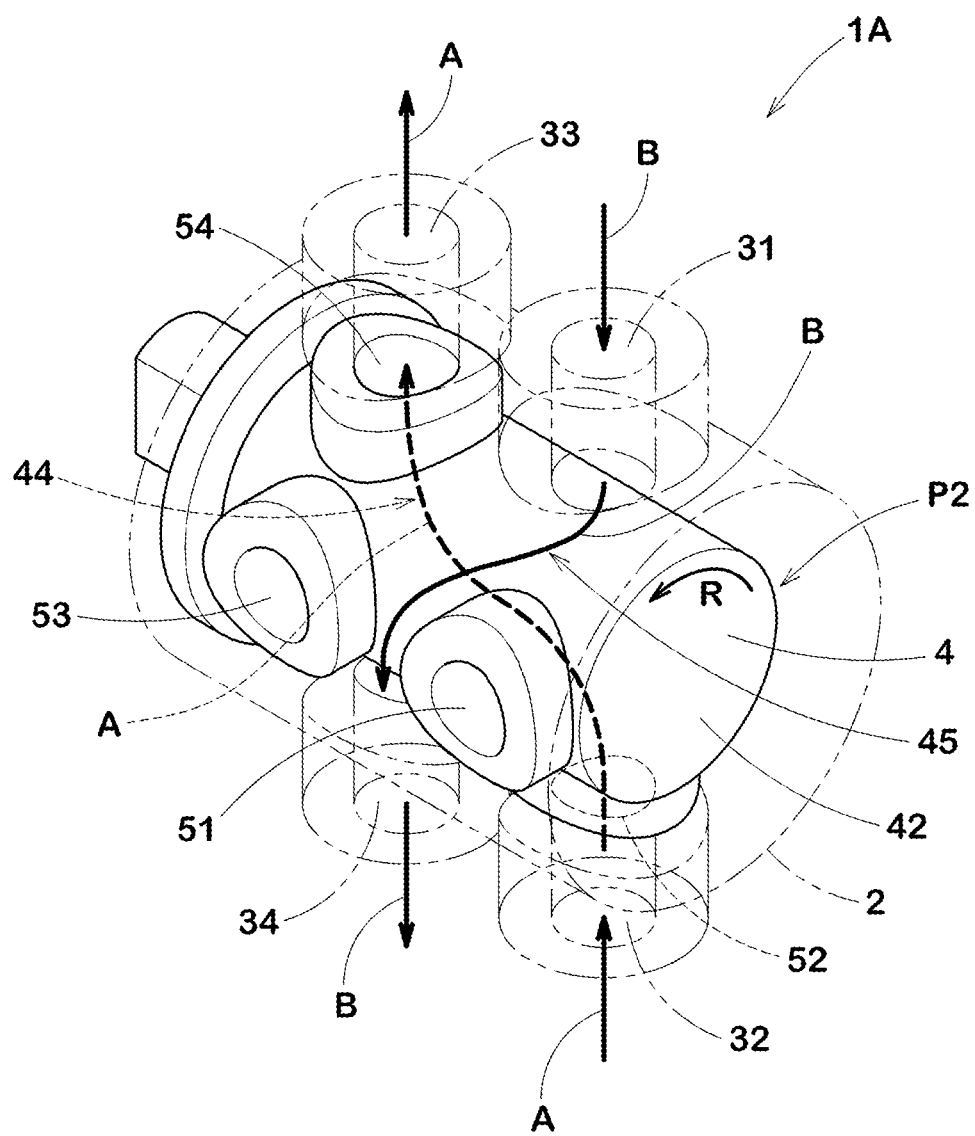
FIG. 12 A perspective view of the valve device with the valve body at the second switching position.
Figure 13:
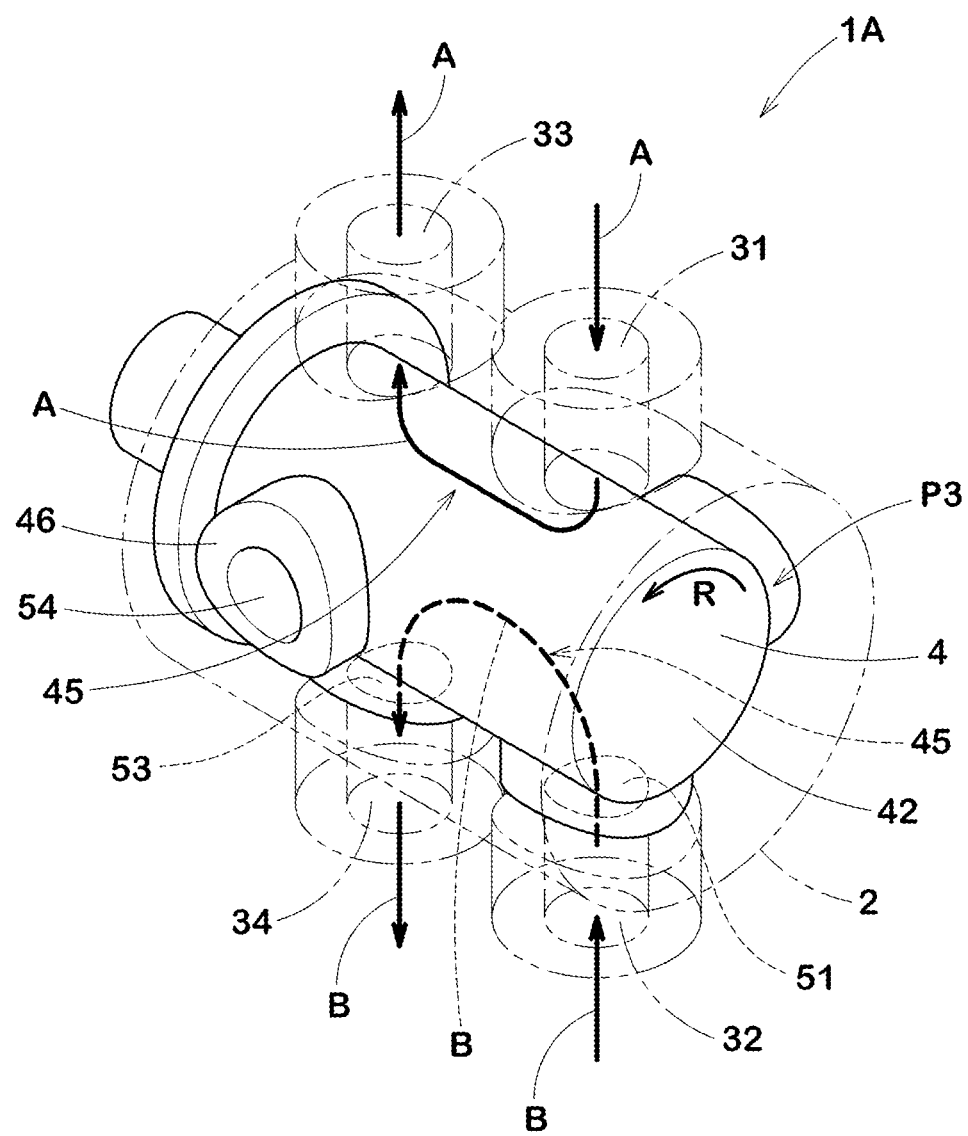
FIG. 13 A perspective view of the valve device with the valve body at the third switching position.
Figure 14:
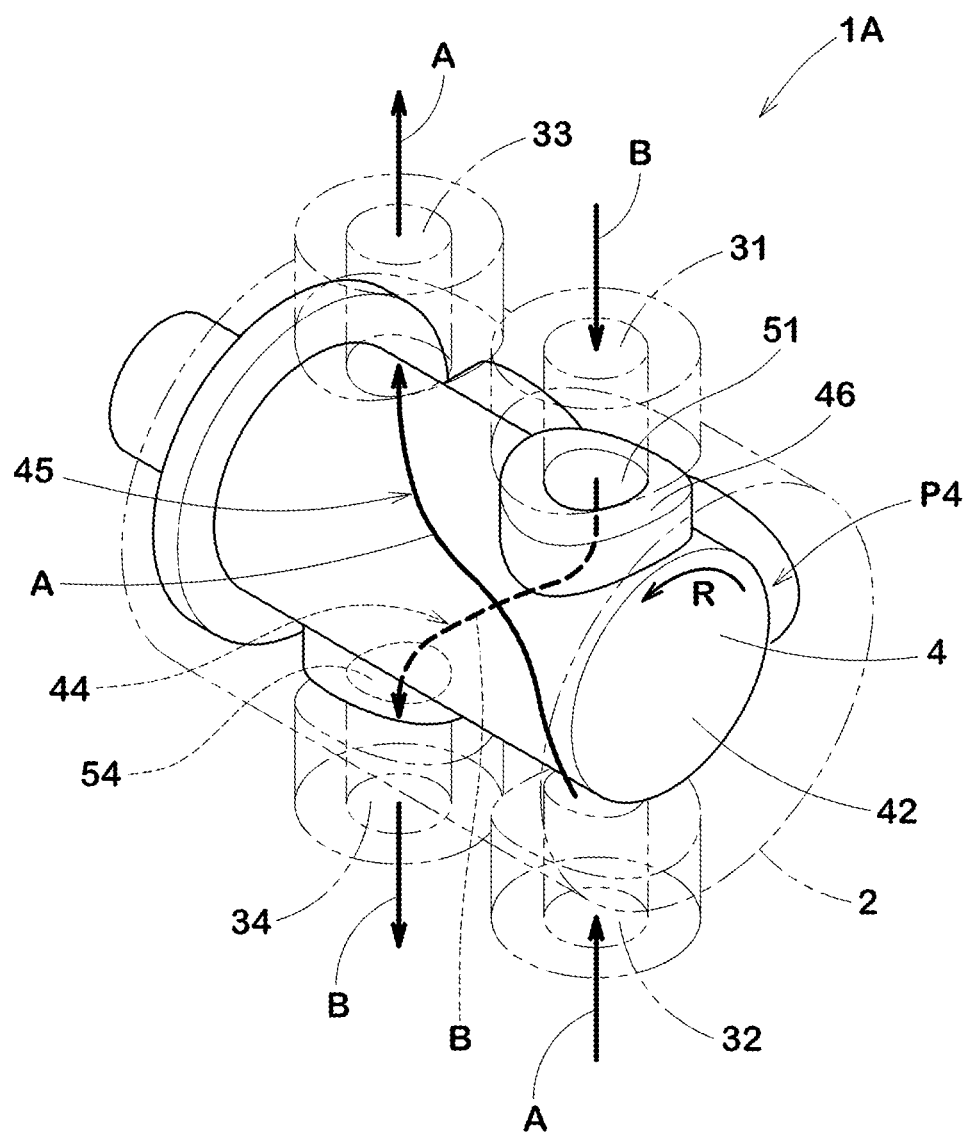
FIG. 14 A perspective view of the valve device with the valve body at the fourth switching position.

As depicted in FIGS. 11 and 13, the first inner port 51 communicates with the first supply port 31 at the first switching position P1, and communicates with the second supply port 32 at the third switching position P3. As depicted in FIGS. 12 and 14, the second inner port 52 communicates with the second supply port 32 at the second switching position P2, and communicates with the first supply port 31 at the fourth switching position P4. As depicted in FIGS. 13 and 11, the third inner port 53 communicates with the second discharge port 34 at the third switching position P3, and communicates with the first discharge port 33 at the first switching position P1. As depicted in FIGS. 14 and 12, the fourth inner port 54 communicates with the second discharge port 34 at the fourth switching position P4, and communicates with the first discharge port 33 at the second switching position P2.

Further, in the present valve device 1A, the first inner port 51 and the second inner port 52 are disposed so as to be positionally shifted by 90 degrees around the axial direction. Also, the first inner port 51 and the third inner port 53 are disposed side by side in the axial direction. Furthermore, the third inner port 53 and the fourth inner port 54 are disposed so as to be positionally shifted by 270 degrees (−90 degrees) around the axial direction. Thereby, around the axial direction with reference to the first inner port 51, with the arrow (R) direction taken as positive, the second inner port 52 is disposed so as to be positionally shifted by 90 degrees, the third inner port 53 is disposed so as to be positionally shifted by zero degrees, and the fourth inner port 54 is disposed so as to be positionally shifted by 270 degrees.

By the above-described arrangement of the inner ports 51, 52, 53, and 54 in combination with the arrangement of the first supply port 31 and the first discharge port 33, and the second supply port 32 and the second discharge port 34, it is possible that the valve body 4 is positioned at the first switching position P1, the second switching position P2, the third switching position P3, and the fourth switching position P4 sequentially by rotating the valve body 4 by 90 degrees counterclockwise when viewed in the axial direction from the side wall 42. It should be noted that the shift angle between the first inner port 51 and the second inner port 52, the shift angle between the second inner port 52 and the third inner port 53, the shift angle between the third inner port 53 and the fourth inner port 54, and the shift angle between the fourth inner port 54 and the first inner port 51 are also not limited to 90 degrees, and may be an angle near 90 degrees, for example.

Also in the valve device 1A, the valve body 4 rotates by 90 degrees counterclockwise when viewed in the axial direction from the side wall 42. As with the valve device 1, also in the present valve device 1A, the valve body 4 may be rotated by 90 degrees clockwise when viewed in the axial direction from the side wall 42. Further, the rotational angle is not limited to 90 degrees, and may be any rotational angle which ensures the above-described port communication state.

While detailed description has been made of the valve device 1 and so forth of the present invention, the present invention can be embodied in various modified forms without being limited to the above-described specific embodiments. That is, the valve device 1 is at least required to include the cylindrical housing 2 defining the space 21 therein, and the valve body 4 disposed in the space 21 of the housing 2 so as to be rotatable around an axial direction of the housing 2, wherein the housing 2 is provided with the first supply port 31, the second supply port 32, the first discharge port 33, and the second discharge port 34 each communicating with the space 21, the valve body 4 is provided with the inner flow path 44 extending so as to penetrate through inside of the valve body 4 and the outer flow path 45 formed between the outer peripheral surface of the valve body 4 and the housing 2, the valve body 4 is configured to have, with respect to the housing 2, (1) the first switching position P1 where the first supply port 31 and the first discharge port 33 communicate with each other via the inner flow path 44 and the second supply port 32 and the second discharge port 34 communicate with each other via the outer flow path 45, (2) the second switching position P2 where the first supply port 31 and the second discharge port 34 communicate with each other via the outer flow path 45 and the second supply port 32 and the first discharge port 33 communicate with each other via the inner flow path 44, (3) the third switching position P3 where the first supply port 31 and the first discharge port 33 communicate with each other via the outer flow path 45 and the second supply port 32 and the second discharge port 34 communicate with each other via the inner flow path 44, and (4) the fourth switching position P4 where the first supply port 31 and the second discharge port 34 communicate with each other via the inner flow path 44 and the second supply port 32 and the first discharge port 33 communicate with each other via the outer flow path 45.

BRIEF DESCRIPTION OF THE DRAWINGS 1 valve device
1A valve device
2 housing
4 valve body
7 driving unit
31 first supply port
32 second supply port
33 first discharge port
34 second discharge port
44 inner flow path
45 outer flow path
46 protruding portion
51 first inner port
52 second inner port
53 third inner port
54 fourth inner port
100 electrolyzed water generation device
110 electrolyzing unit
140 electrolytic chamber
140a first polarity chamber
140b second polarity chamber
141 first power feeder
142 second power feeder
143 diaphragm
170 control unit
A fluid
fluid
P1 first switching position
P2 second switching position
P3 third switching position
P4 fourth switching position

The invention claimed is:
1. A valve device comprising:
a cylindrical housing defining a space therein; and
a valve body disposed in the space of the housing so as to be rotatable around an axial direction of the housing, wherein
the housing is provided with a first supply port, a second supply port, a first discharge port, and a second discharge port each communicating with the space,
the valve body is provided with an inner flow path extending so as to penetrate through inside of the valve body and an outer flow path formed between an outer peripheral surface of the valve body and the housing, and
the valve body is configured to have, with respect to the housing,
(1) a first switching position where the first supply port and the first discharge port communicate with each other via the inner flow path and the second supply port and the second discharge port communicate with each other via the outer flow path,
(2) a second switching position where the first supply port and the second discharge port communicate with each other via the outer flow path and the second supply port and the first discharge port communicate with each other via the inner flow path,
(3) a third switching position where the first supply port and the first discharge port communicate with each other via the outer flow path and the second supply port and the second discharge port communicate with each other via the inner flow path, and
(4) a fourth switching position where the first supply port and the second discharge port communicate with each other via the inner flow path and the second supply port and the first discharge port communicate with each other via the outer flow path.

2. The valve device according to claim 1, wherein
the second supply port and the first supply port are arranged in the axial direction of the housing,
the first discharge port and the first supply port are arranged in a circumferential direction of the housing, and
the second discharge port and the second supply port are arranged in the circumferential direction of the housing, and the second discharge port and the first discharge port are arranged in the axial direction of the housing.

3. The valve device according to claim 2, wherein
the valve body has inner ports communicating with the inner flow path, and
the inner ports include
a first inner port communicating with the first supply port at the first switching position and communicating with the first discharge port at the second switching position,
a second inner port communicating with the second supply port at the second switching position and communicating with the second discharge port at the third switching position,
a third inner port communicating with the second supply port at the third switching position and communicating with the second discharge port at the fourth switching position, and
a fourth inner port communicating with the first supply port at the fourth switching position and communicating with the first discharge port at the first switching position.

4. The valve device according to claim 3, wherein
the first supply port and the first discharge port are disposed so as to be positionally shifted by 90 degrees around the axial direction, and the second supply port and the second discharge port are disposed so as to be positionally shifted by 90 degrees around the axial direction.

5. The valve device according to claim 4, wherein
the first inner port and the second inner port are disposed so as to be positionally shifted by 90 degrees around the axial direction, the second inner port and the third inner port are disposed so as to be positionally shifted by 90 degrees around the axial direction, and the third inner port and the fourth inner port are disposed so as to be positionally shifted by 90 degrees around the axial direction.

6. The valve device according to claim 1, wherein
the second supply port and the first supply port are arranged in a circumferential direction of the housing,
the first discharge port and the first supply port are arranged in the axial direction of the housing, and
the second discharge port and the second supply port are arranged in the axial direction of the housing, and the second discharge port and the first discharge port are arranged in the circumferential direction of the housing.

7. The valve device according to claim 6, wherein
the valve body has inner ports communicating with the inner flow path, and
the inner ports include
a first inner port communicating with the first supply port at the first switching position and communicating with the second supply port at the third switching position,
a second inner port communicating with the second supply port at the second switching position and communicating with the first supply port at the fourth switching position,
a third inner port communicating with the second discharge port at the third switching position and communicating with the first discharge port at the first switching position, and
a fourth inner port communicating with the second discharge port at the fourth switching position and communicating with the first discharge port at the second switching position.

8. The valve device according to claim 3 or 7, wherein
the valve body includes a cylindrical peripheral wall and a plurality of protruding portions protruding outward in a radial direction from the peripheral wall to be in contact with an inner peripheral surface of the housing, and
the inner ports are formed so as to penetrate through the peripheral wall and the protruding portions in the radial direction.

9. The valve device according to claim 1, further comprising
a driving unit to rotationally drive the valve body only to one direction.

10. An electrolyzed water generation device comprising:
the valve device according to claim 1; and
an electrolyzing unit electrolyzing water to produce electrolyzed water, wherein
the electrolyzing unit includes an electrolytic chamber to which the water is suppled, a first power feeder and a second power feeder having different polarities and disposed inside the electrolytic chamber, and a diaphragm dividing the electrolytic chamber into a first polarity chamber on the first power feeder side and a second polarity chamber on the second power feeder side, and
the first polarity chamber is connected with the first supply port, and the second polarity chamber is connected with the second supply port.

11. The electrolyzed water generation device according to claim 10, further comprising a control unit to switch the polarities of the first power feeder and the second power feeder.

* * * * *